United States Patent
Rakib (10) Patent No.: US 7,298,762 B2
(45) Date of Patent: Nov. 20, 2007

(54) METHOD FOR SHARING AN UPSTREAM AMONG MULTIPLE DOWNSTREAMS

(75) Inventor: Selim Shlomo Rakib, Cupertino, CA (US)

(73) Assignee: Terayon Communication Systems, Inc., Santa Clara, CA (US)

(*) Notice: Subject to any disclaimer, the term of this patent is extended or adjusted under 35 U.S.C. 154(b) by 1042 days.

(21) Appl. No.: 10/295,712

(22) Filed: Nov. 15, 2002

(65) Prior Publication Data
US 2004/0095963 A1 May 20, 2004

(51) Int. Cl.
*H04J 3/16* (2006.01)
(52) U.S. Cl. .............. 370/468; 370/230; 370/252; 370/392; 370/503
(58) Field of Classification Search ........ 370/230, 370/235, 252, 392, 295, 432, 458, 468
See application file for complete search history.

(56) References Cited

U.S. PATENT DOCUMENTS

| | | | |
|---|---|---|---|
| 5,648,958 A * | 7/1997 | Counterman | 370/458 |
| 5,963,557 A * | 10/1999 | Eng | 370/432 |
| 6,490,727 B1 * | 12/2002 | Nazarathy et al. | 725/129 |
| 6,650,624 B1 * | 11/2003 | Quigley et al. | 370/252 |
| 6,917,614 B1 * | 7/2005 | Laubach et al. | 370/392 |
| 7,085,287 B1 * | 8/2006 | Chapman | 370/468 |
| 7,164,697 B1 * | 1/2007 | Beser | 370/485 |

* cited by examiner

*Primary Examiner*—Edan Orgad
*Assistant Examiner*—Andrew C. Lee
(74) *Attorney, Agent, or Firm*—Thelen Reid Brown Raysman & Steiner LLP (57) ABSTRACT

A process and apparatus for sharing an upstream between multiple downstreams. A automatic discovery process carried out by the CMTS using ranging messages is used to build routing tables that define which cable modems are coupled to each downstream. The downstreams are coordinated in timestamps, MAP messages and UCD messages, and symbol clock frequency if synchronous code division multiplexed bursts are allowed upstream. Also disclosed is a flexible mapper/splitter/combiner that can electronically control switching, combining and splitting as necessary to couple multiple downstreams that share the same upstream onto the same optical nodes or split downstreams that share the same upstream among multiple optical nodes and combine upstreams from multiple HFC systems onto a single upstream input to a CMTS receiver so the CMTS receiver can be fully utilized.

9 Claims, 5 Drawing Sheets

UPSTREAM RANGING BURST

FIG. 6

UCD MESSAGE

METHOD FOR SHARING AN UPSTREAM AMONG MULTIPLE DOWNSTREAMS

BACKGROUND OF THE INVENTION

In original DOCSIS 1.0 systems, a single downstream channel on the hybrid fiber coaxial cable signal delivery system was shared by multiple upstreams. This was necessary because the maximum symbol rate in DOCSIS 1.0 was 1.28 megasymbols per second with QPSK modulation. This so limited the throughput that in order for users to have a good experience, it was necessary to have multiple upstream channels, each of which was coupled to only a percentage of the cable modems of the entire system with all cable modems coupled to the same downstream. In this model, the cable modems all receive video programs or requested broadband services by the same downstream, and the Cable Modem Termination System (CMTS) knows on which upstream to listen for requests, replies and upstream data from each cable modem.

In DOCSIS 1.0 systems, the upstream was minislots which are equivalent to timeslots, and each cable modem received synchronization messages (sync messages) on the downstream which contained timestamps. These timestamps were samples of a timestamp counter in the CMTS which served as the master clock. Each cable modem (CM) synchronized a local timestamp counter to the master timestamp counter in the CMTS using the timestamp samples in the sync messages. The master timestamp counter count was and still is in current DOCSIS systems used to determine the boundaries in time of upstream minislots. The local timestamp counter in each CM was used to determine when each minislot occurred for purposes of timing upstream bursts transmitted by each CM. In DOCSIS systems, each CM is allowed to transmit upstream only during assigned minislots. Assignments come to each CM by downstream messages called grants.

Before a CM can transmit upstream, it must register its presence with the CMTS and be trained. The training process involves both initial and periodic ranging, equalization, power offset adjustment and frequency offset adjustment although equalization was only implemented in DOCSIS 1.1 and later. Ranging is the process of determining the offset between the timstamp counter in the CM and the timestamp counter in the CMTS and setting a proper offset given the distance of the CM from the CMTS. The proper offset is the offset such that when a grant for an upstream burst for minislot 100 is received, the CM can use its local timestamp counter to determine when to transmit and the timing will be such that the burst arrives at the CMTS with its boundaries aligned in time with the boundaries of minislot 100.

Initial ranging is carried out by all CMs by receiving a ranging invitation in a MAP message broadcast in the downstream that identifies an initial ranging window in terms of a group of contiguous minislots in the upstream—an interval during which no modem is assigned to transmit payload data. Initial ranging intervals are put in the MAP messages periodically so new modems which have powered up can get synchronized with the system, and ranging if the first thing they do. They do this by searching the MAP messages sent downstream to find the minislot boundaries of an initial ranging window. Each CM that is training then sets its initial offset (between its timstamp counter and the timestamp counter of the transmitter of the downstream the CM is listening to) so that it appears to be right next to the CMTS. The CM then transmits an initial ranging burst for ranging and equalization and power level training. This initial "station maintenance burst" (hereafter ranging burst) has a preamble of symbols known to the CMTS.

This initial station maintenance burst is transmitted upstream at a time which that CM thinks will cause its ranging burst to arrive during the initial ranging window. The CMTS receives the ranging burst at some time within the window (because the initial ranging window is very wide), and, assuming there is no collision, will be able to measure the time offset of the time of reception of the burst versus the time of the opening of the initial ranging window. If the CM's offset is wrong, the CMTS will detect this fact by detecting the start of burst by detecting the preamble. The CMTS will then measure the offset, and send a message in the downstream addressed to the CM telling it by how much to adjust its offset and in which direction to achieve synchronization.

Periodic ranging happens periodically, and is by invitation only by a message in the downstream directed to a specific CM telling it when a much more narrow periodic ranging window will be open for that CM to send a periodic ranging burst.

The ranging burst preamble is also used to generate equalization coefficients for the upstream channel. These coefficients are sent back down to the CM after convergence in the CMTS where they are convolved with the existing coefficients of the precode filter of the CM upstream transmitter to generate new equalization coefficients for the precode filter which is used to filter subsequent upstream bursts.

With the advent of DOCSIS 2.0 and DOCSIS 1.1 systems described in national standards published by Cable Labs (which are hereby incorporated by reference and cited as prior art), higher upstream symbol rates and more complex constellations have made more upstream throughput available. In fact, the situation is now almost completely reversed in that there is more upstream capacity than downstream. With DOCSIS 2.0, the increased upstream traffic throughput availability often makes it a waste to dedicate a single upstream receiver at the CMTS to each optical node since the CMTS receiver for each optical node is under utilized. It would be advantageous therefor to pool the traffic from multiple upstreams from different optical nodes so the the full upstream capacity of the media and the CMTS receiver is used.

Further, current CMTS configurations for DOCSIS 1.0 and 1.1 installations have a fixed ratio of upstreams and downstreams with one downstream shared by a plurality of upstreams in all the CMTS equipment available in the prior art. Thus, when the demand exceeds the capacity of the single downstream, more equipment must be purchased to add another downstream and that adds 4 to 6 new upstreams which are not needed. Thus, the cable operator has to pay for more equipment than is needed to just add a new downstream channel.

To provide flexibility to cable operators to meet demand for more downstream capacity without forcing them to buy more upstream capacity than they need, a need has arisen for a method of sharing a single upstream between two or more downstreams. This provides maximum utilization of the CMTS equipment and reduces the costs to the cable operator. In other words, it is advantageous to be able to alter the prior art fixed ratio of upstreams to downstreams to fit current needs and to be able to change the ratio in the future as needs change.

Further, the CMTS equipment currently in existence have hard wired relationships between transmitters and receivers and the optical nodes they serve. Thus, when demand changes and more downstreams or upstreams need to be coupled to the same optical node or a plurality of downstreams need to be split up between a plurality of optical nodes, major rewiring at the CMTS is necessary which is laborious and time consuming.

Accordingly, a need has arisen for a method to share an upstream between multiple downstreams and to provide a flexible mapping between different numbers of downstreams and a shared upstream. A need has also arisen for equipment and processes which obviate the re-wiring problem by providing a sort of cross-bar switch mechanism which can flexibly map different numbers of downstreams to a shared upstream and to split out multiple downstreams to multiple optical nodes so that each gets a copy of each of the multiple downstreams. This "crossbar switch" must also be able to divide up multiple downstreams that share an upstream among a plurality of optical nodes. Finally, this equipment must monitor the upstream and downstream equipment and reconfigure to connect new transmitter or receiver equipment to take over for failed equipment of a downstream or upstream.

SUMMARY OF THE INVENTION

The genus of the invention is defined by a CMTS which can transmit multiple downstreams to multiple cable modems all of which share the same upstream. There are certain requirements on the downstreams which differ depending upon whether the shared upstream allows synchronous code division multiple access (SCDMA) bursts or not.

If the shared upstream is time division multiplexed only and no SCDMA bursts are allowed, then the only requirements on the downstreams are as follows. In the claims, the downstreams which have these characteristics and which share an upstream are referred to as coordinated downstreams.

1) Each downstream transmitter for a downstream that shares an upstream must have a timestamp counter or something equivalent which counts the same master clock. Fixed offsets in the timestamp counts are permissible, but no drift is permissible.
2) Each downstream transmitter must transmit sync messages or something equivalent which contain the timestamp counts which the CMs can use to keep a local timestamp counter in each CM "synchronized" to the timestamp counter of the downstream transmitter the CM is tuned to. Synchronized means a proper offset between the timestamp counts exists so that when a CM gets an upstream timeslot or minislot assignment, it can use its timestamp counter to determine the correct time to transmit so that its bursts arrive at the CMTS aligned in time with the boundaries of the assigned timeslots or minislots.
3) Each downstream transmitter must transmit an Upstream Channel Descriptor (UCD) message or something equivalent which defines the shared upstream in terms of the same parameters, with each UCD message containing the downstream ID of the downstream it is transmitted upon and the upstream ID of the shared upstream.
4) Each downstream transmitter must transmit a MAP message or there must be something which tells the CMs when a ranging contention interval exists when CMs can transmit upstream ranging bursts in response to the MAP message using the downstream ID from the UCD message in the downstream to which the CM is tuned. This ranging process is an attempt to coordinate with the CMTS by an exchange of messages to set a proper offset into the CM timestamp counter so as to achieve synchronization. The MAP messages must be coordinated so that they all define the same ranging contention interval in the upstream and there is no conflict between the timeslot assignments on the upstream between different CMs.
5) The CMTS must be able to build routing tables for each downstream from information in the ranging bursts or registration messages of each CM. Specifically, if the ranging bursts are used, the CMTS must be able to build the routing table for each downstream from the downstream ID information and the SID or something equivalent which identifies the CM which sent each initial ranging burst so as to automatically determine which CMs are listening to each downstream.

If the upstream allows SCMDA bursts (the following requirements would also work if the upstream allows both SCDMA and Time Division Multiple Access (TDMA) bursts), the requirements are as follows. In the claims, the downstreams which have these characteristics and which share an upstream are referred to as coordinated downstreams.

1) Each downstream transmitter for a downstream that shares an upstream must have a timestamp counter or something equivalent which counts the same master clock. Fixed offsets in the timestamp counts are permissible, but no drift is permissible.
2) Each downstream transmitter must use the same frequency symbol clock and the same symbol rate and the symbol clocks on all downstreams must be locked in phase.
3) The CMs must each recover the downstream symbol clock of the downstream it is tuned to and synchronize its upstream symbol clock to the downstream symbol clock using an M/N relationship between the frequency and phase of the downstream symbol clock versus the frequency and phase of the upstream symbol clock, where M and N are integers, and the upstream symbol clock is at a frequency suitable to generate spread spectrum bursts. In non DOCSIS systems with suitable range, the symbol clocks on the downstreams could be different but they would have to be harmonically related such that any downstream clock that is different than another downstream clock would have to have a frequency which is an integer multiple of the downstream symbol clock of the other downstream symbol clock(s).
4) Each downstream transmitter must transmit sync messages or something equivalent which contain the timestamp counts which the CMs can use to keep a local timestamp counter in each CM "synchronized" to the timestamp counter of the downstream transmitter the CM is tuned to. Synchronized means a proper offset between the timestamp counts exists so that when a CM gets an upstream timeslot or minislot assignment, it can use its timestamp counter to determine the correct time to transmit so that its bursts arrive at the CMTS aligned in time with the boundaries of the assigned timeslots or minislots.
5) Each downstream transmitter must transmit a UCD message or something equivalent which defines the shared upstream in terms of the same parameters, with each UCD message containing the downstream ID of the downstream it is transmitted upon and the upstream ID of the shared upstream.

6) Each downstream transmitter must transmit a MAP message or there must be something which tells the CMs when a ranging contention interval exists when CMs can transmit upstream ranging bursts in response to the MAP message using the downstream ID from the UCD message in the downstream to which the CM is tuned. This ranging process is an attempt to coordinate with the CMTS by an exchange of messages to set a proper offset into the CM timestamp counter so as to achieve synchronization. The MAP messages must be coordinated so that they all define the same ranging contention interval in the upstream and there is no conflict between the timeslot assignments on the upstream between different CMs.

7) The CMTS must be able to build routing tables for each downstream from information in the ranging bursts or registration messages of each CM. Specifically, if the ranging bursts are used, the CMTS must be able to build the routing table for each downstream from the downstream ID information and the SID or something equivalent which identifies the CM which sent each initial ranging burst so as to automatically determine which CMs are listening to each downstream.

The CMTS uses an automatic discovery process to determine the CMs on each downstream. This is done by interrupting the downstreams when the new CMTS is installed. This causes each CM to search for a valid downstream and latch onto the first one they find. The new CMTS then establishes multiple downstreams all mapped to the same upstream. On each downstream, a MAP message (coordinated to define the same ranging interval) is sent which tells the CMs listening to that downstream when an initial ranging contention window is on the upstream. Each downstream transmitter then also sends a UCD message which defines the shared upstream using the same parameters and contains the downstream ID on which it was sent and the shared upstream ID. The CMs respond to the MAP message by sending an initial ranging burst message. This message has the downstream ID the CM is listening to from the UCD message and a Service Identifier (SID) which identifies the CM. The CMTS uses the SID and downstream ID in each upstream ranging burst to build a routing table which identifies which CMs are listening to each downstream.

DETAILED DESCRIPTION OF THE PREFERRED EMBODIMENT AND ALTERNATIVE EMBODIMENTS

Figure 1:
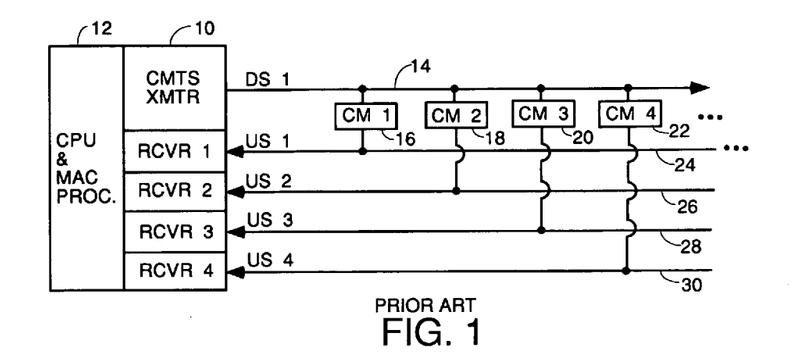
FIG. 1 is a diagram of the prior art DOCSIS 1.0 or 1.1 system with a shared downstream and a fixed number of low capacity upstreams.

FIG. 1 is a diagram of the prior art DOCSIS 1.0 or 1.1 system with a shared downstream and a fixed number of low capacity upstreams. A single CMTS transmitter 10 receives media access control (MAC) messages and data packet PDUs for transmission downstream from a MAC process running on computer 12. The transmitter 10 transmits these messages and downstream data PDUs on a downstream channel represented by line 14.

A plurality of cable modems, represented by blocks 16, 18, 20 and 22 are a small subset of the total number of modems in the system sharing the downstream channel 14. Because in prior art DOCSIS 1.0 and 1.1 systems, the upstream throughput is limited by a slow symbol clock rate and relatively non complex constellation, the cable modems (CM) are divided into a number of subsets, each subset sending upstream bursts on a different upstream channel. Four different upstream channels are shown in FIG. 1 as channels 24, 26, 28 and 30. Each channel is transmitted on the same physical medium but has its own Upstream Channel Descriptor (UCD) message which defines the parameters of the upstream channel with which the UCD message is associated. The UCD message for each upstream is transmitted by the CMTS on the shared downstream 14 and describes the center frequency, modulation type, symbol rate etc. of the upstream channel to which it pertains. CM 16 transmits on upstream channel 24. CM 18 transmits on upstream channel 26, and CM 20 transmits on upstream channel 28. CM 22 transmits on upstream channel 30.

Each upstream channel has its own dedicated receiver in the CMTS. Dedication of a single receiver per each optical node is a waste of receiver processing power. Typically, each upstream channel typically has a group of CMs which are all served by a single optical node. The optical node has one coaxial cable coupled to all the CMs and a single fiber coupling the optical node to the CMTS receiver. This is also a waste of the bandwidth of the fiber from each optical node to the receiver since the total upstream traffic of the group of CMs is typically much smaller than the capacity of the fiber.

Further, the CMTS in FIG. 1 is a piece of equipment that has fixed wiring relationships between its transmitters and receivers and the optical nodes coupled to the various upstreams and the relationships between the number of upstreams and downstream is fixed. Thus, when another downstream needs to be added, four new upstreams which are unneeded must also be added because there is no piece of equipment available such as a line card which can be added to the CMTS which just adds another downstream.

This provides insufficient flexibility to the cable system operator and forces her to buy more upstream capacity when all she really needs is more downstream capacity. And this problem will get worse as improvements in DOCSIS add further upstream capacity.

Figure 2:
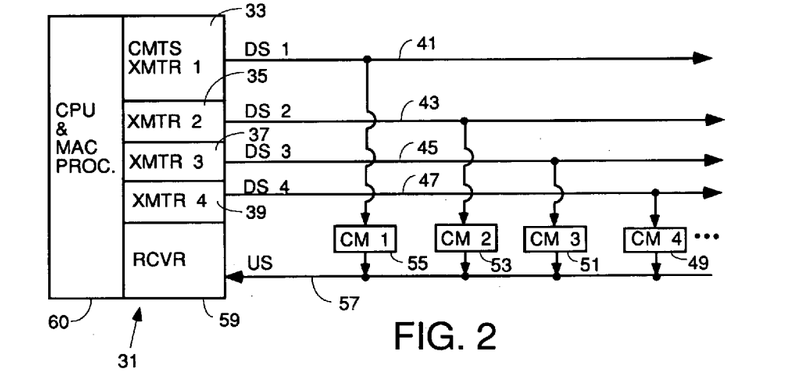
FIG. 2 is a diagram of a hybrid fiber-coaxial (HFC) system having a CMTS which allows multiple downstreams to share a single upstream.

The solution to this problem is represented by FIG. 2 which shows a CMTS which allows a flexible number of downstreams to all share the same upstream.

CMTS 31 has a plurality of line cards which are downstream transmitters only shown at 33, 35, 37 and 39. Each transmitter line card drives a single downstream channel, represented by lines 41, 43, 45 and 47. Although these separate downstreams are indicated by separate lines, in reality, they are four different logical channels on the same physical medium in some embodiments. In other embodiments, the downstreams 41, 43, 45 and 47 are transmitted on physically different medium such as separate downstream fibers coupled to separate optical nodes. In embodiments where the downstreams are carried on the same medium at different frequencies and with non overlapping bandwidth, the physical medium which transmits these four separate logical channels is a downstream fiber coupled to an optical node (not shown) which converts the optical signals to electrical signals and couples these electrical signals onto a coaxial cable which is coupled to a plurality of cable modems. By superposition, all four downstream signals will be on the coaxial cable coupled to all the modems, but each will be at a different frequency.

The plurality of cable modems are represented by blocks 49, 51, 53 and 55. In some embodiments within the genus of the invention however, separate transmitters in the CMTS drive separate downstream fibers coupled to separate optical nodes so that multiple HFC systems can be coupled to the same CMTS.

All the cable modems 49 through 55 are coupled to the same shared upstream logical channel 57. The upstream logical channel is carried upstream on a different frequency than the downstream logical channels on the coaxial cable portion of the HFC system to the optical node and is carried from the optical node to the CMTS on a separate upstream fiber connecting the optical node to the CMTS. At the CMTS, the upstream fiber is coupled through a transducer to the RF input of a receiver 59.

In the preferred embodiment, all the downstreams and the upstream are DOCSIS MPEG transport streams, usually of the DOCSIS 2.0 variety although the invention is also applicable to lower versions of DOCSIS and legacy systems such as the Terayon synchronous code division multiplexed (SCDMA) legacy system described in U.S. Pat. No. 6,307,868 (TER-002.3P) which is hereby incorporated by reference for its teachings of SCDMA transmitters and receivers and for its other teachings as well.

Because DOCSIS 2.0 allows upstream SCDMA bursts, the upstream symbol clock on upstream channel 57 must be locked in an M/N phase and frequency relationship to the symbol clocks on all the downstreams that share the same upstream. Also, the symbol clocks and symbol rates of all the downstreams that share the same upstream must be the same frequency and must be locked in phase and frequency to each other.

Also, each of the CMs 49, 51, 53 and 55 in FIG. 2 has a timestamp counter which must be synchronized to the timestamp counter of the transmitter driving the downstream to which the CM is coupled, each timestamp counter in the line card transmitters driving the downstreams 41, 43, 45 and 47 must be driven by the same master clock in the CMTS 31. It is permissible for each transmitter 33, 35, 37 and 39 to have its own timestamp counter which has a fixed offset from the timestamp counters of the other transmitters 33, 35, 37 and 39, but each timestamp counter of the transmitters 33, 35, 37 and 39 must be driven by the same master clock so the offsets between each timestamp counter are fixed and do not vary. Each CM must adjust the offset between its timestamp counter and the timestamp counter in the downstream transmitter to which the CM is coupled in the ranging process (initial station maintenance). Each CM must do this so that it is synchronized with the CMTS and all the other CMs that will be sharing the upstream minislots. This is necessary so when that CM gets a downstream MAP message assigning specified upstream minislot numbers to that CM for an upstream burst, that CM can use its local timestamp counter to figure out where the boundaries are in time of the assigned minislots. When the offset is correct, if the CM gets an assignment to transmit upstream during minislot 100, the local timestamp counter can be used to determine when to transmit such that the burst arrives at the CMTS with its boundaries aligned in time with the boundaries of minislot 100. The MAP messages must be coordinated so that they all define the same ranging contention interval in the upstream and there is no conflict between the timeslot assignments on the upstream between different CMs.

If the invention were applied to a system which was DOCSIS 1.1 or 1.0 or a legacy system which was time division multiple access (TDMA) or synchronized time division multiple access (STDMA) and which did not allow SCDMA bursts, then the symbol rates of the different downstreams can be different. However, the CMs all must synchronize their timestamp counters to the timestamp counter of the downstream transmitter to which the CM is coupled and set the offset properly during the ranging process so that each CM is synchronized with the other CMs and the CMTS so that its bursts will arrive at the CMTS aligned in time with the boundaries of the minislots assigned to that CM for upstream bursts.

Figure 3:
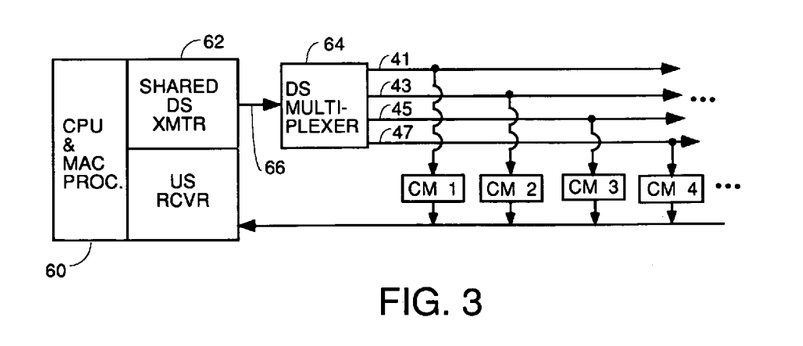
FIG. 3 is a diagram of an alternative embodiment where one transmitter is used to transmit the different downstreams using an output multiplexer/modulator that puts the burst data for each downstream on the correct downstream radio frequency carrier.

The invention requires separate downstreams sharing the same upstream, but any way this can be accomplished is within the teachings of the invention. For example, a single transmitter with an output multiplexer can be used to transmit all the different downstream data streams, as shown in FIG. 3. In this embodiment, a shared downstream transmitter receives the four different data and message streams for each of four different DOCSIS downstreams represented by lines 41, 43, 45 and 47 from computer and MAC process 60. The transmitter 62 may receive these data streams at different times or simultaneously and buffer them until they can be transmitted. The transmitter 62 then takes the data from each downstream separately and does the error correction encoding, forward error correction, interleaving and mapping into constellation points that any conventional DOCSIS downstream transmitter does and sends one downstream burst at at time to downstream multiplexer or frequency agile modulator 64. The transmitter 62 also controls multiplexer 64 to couple the burst on line 66 to the proper one of the downstream channels.

In embodiments where there is only one downstream medium and all downstream channels are different frequency channels on the shared downstream medium, "multiplexer" 64 is not a switch with multiple outputs. Instead, it is a frequency agile modulator which has either a separate modulator for each downstream which outputs a radio frequency signal at the center frequency of the associate downstream, or is a single modulator with a frequency agile local oscillator which can be commanded to generate an RF carrier (or quadrature carriers) having the frequency of the desired downstream. The local oscillator generates radio frequency signal(s) having the center frequency of the downstream channel on which the transmission is to occur (two carriers at the same frequency by offset by 90 degrees in phase are needed for quadarature amplitude modulation). The constellation points for each downstream are then modulated onto the proper frequency carrier or carriers by "multiplexer" 64. The bursts for each downstream can be sent to the modulator on line 66 at different times to keep them separate.

In embodiments where the separate downstreams are on physically separate mediums such as where multiple downsream fibers coupled to multiple optical nodes are used, then downstream multiplexer 64 is a more traditional multiplexer switch which receives the transport stream for a particular downstream on line 66 in bursts, modulates each burst onto the proper frequency carrier or carriers for the downstream to which the burst belongs, and couples the modulated carrier on the appropriate medium carrying that downstream.

Discovery of Topology and Mac Protocols

Each downstream must have the media access control messages which are conventional to DOCSIS transmitted downstream to allow the CMs coupled thereto to perform training and registration.

When each cable modem first powers up, it searches the medium to which it is connected for a valid DOCSIS downstream. If there are multiple DOCSIS downstreams, the CM will begin to use the first valid DOCSIS downstream it finds.

The CM will then perform a training process to, among other things, determine a proper offset for its timestamp counter such that the CM's upstream transmissions will arrive at the CMTS at the beginning of the minislot to which they have been assigned. After training, the CM registers with the CMTS. If the CMTS determines that too many cable modems have latched onto a particular downstream, the CMTS can do load balancing by sending a dynamic channel change message (DCC). This a message sent by the CMTS to a particular CM which causes the CM to change the upstream channel on which it transmits or change the downstream to which it is tuned, or both. The DCC message tells the CM the frequency of the downstream channel to which it should change, the symbol rate and modulation type of that channel. The DCC message also tells the CM the interleaving depth on the new downstream and the downstream channel identifier and will tell the CM to either wait for a sync message to get a new timestamp to get resynchronized or will include a sync message timestamp for the new channel which has been synchronized (derived from the same clock) with the sync message timestamp for the old channel.

After training and registration of the CMs on each downstream, the data of each DOCSIS downstream is sent on that downstream to the CMs that requested it. However, since multiple sets of CMs are coupled to different downstreams but all are sharing the same upstream, when the CMTS receives a request for data from a particular CM, it must figure out upon which downstream to send the requested data.

This is done by use of a routing table which is built automatically by the CMTS in the preferred embodiment by use of a discovery process. In other embodiments, the routing table is built manually by the cable system operator from data from installations and a fixed assignments of cable modems to particular downstreams. In other words, in this alternative embodiment, no load balancing is performed, and as each cable modem is installed, it is assigned to one downstream channel which it will use all the time until the assignment is manually changed. The advantage of the discovery process is that cable modems can be assigned to different downstream channels, and each time they go through the training process, the CMTS will learn which downstream they are tuned to and will adjust the data in its routing table accordingly. This provides more flexibility to a cable system operator to shift some cable modems from one downstream to another on the same medium to do load balancing.

The computer and MAC process 60 in FIG. 2 do the conventional training and other media access control processes described in the DOCSIS specifications and summarized in the background section of the invention herein for each downstream separately. In other words, the computer and MAC process 60, for each separate downstream, do the conventional media access control protocol processing for ranging, equalization, power level adjustment, registration, sending of timestamps in synchronization messages, sending UCD and MAP messages, etc. known from the DOCSIS specifications. However, because multiple downstreams are sharing an upstream, the computer and MAC process 60 in FIG. 2 also does the following automatic discovery process for each downstream to determine which CMs are coupled to that downstream. This discovery process is done seriatem for each downstream in turn on a round robin basis and is repeated from time to time.

Figure 4:
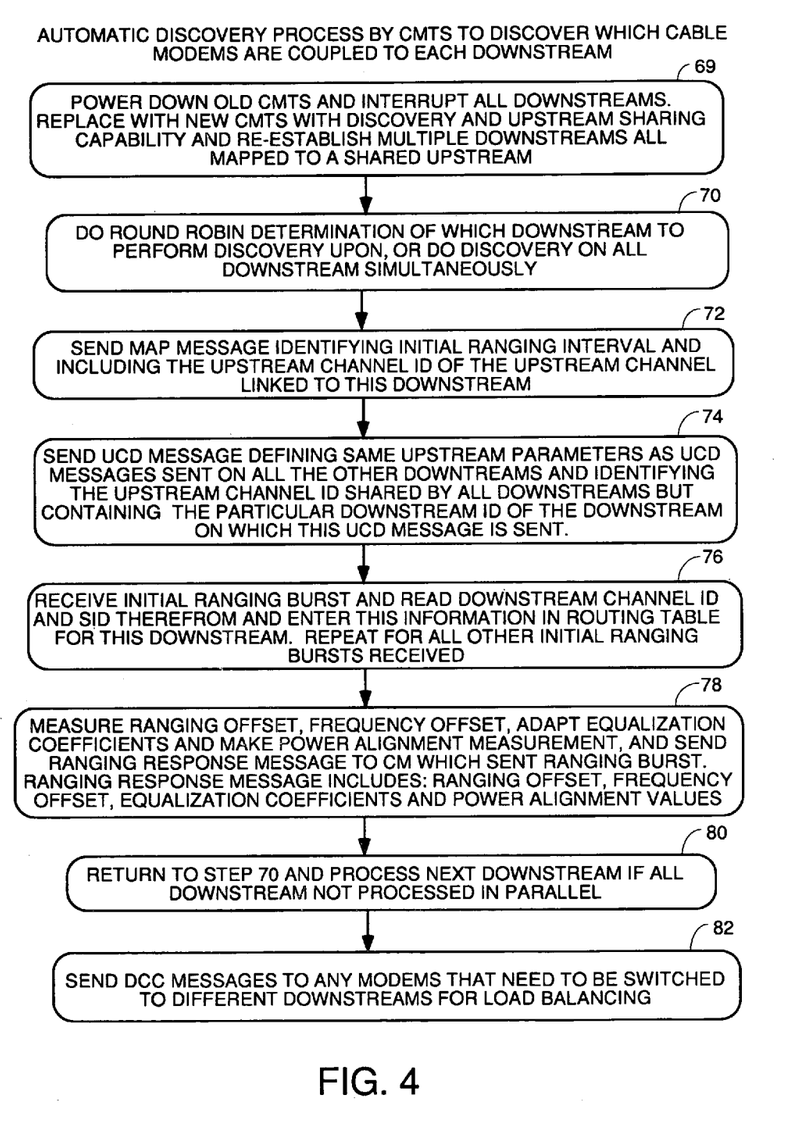
FIG. 4 is a flowchart of the portion of the automatic discovery process performed by the CMTS to determine which cable modems are coupled to which downstreams.
Figure 5:
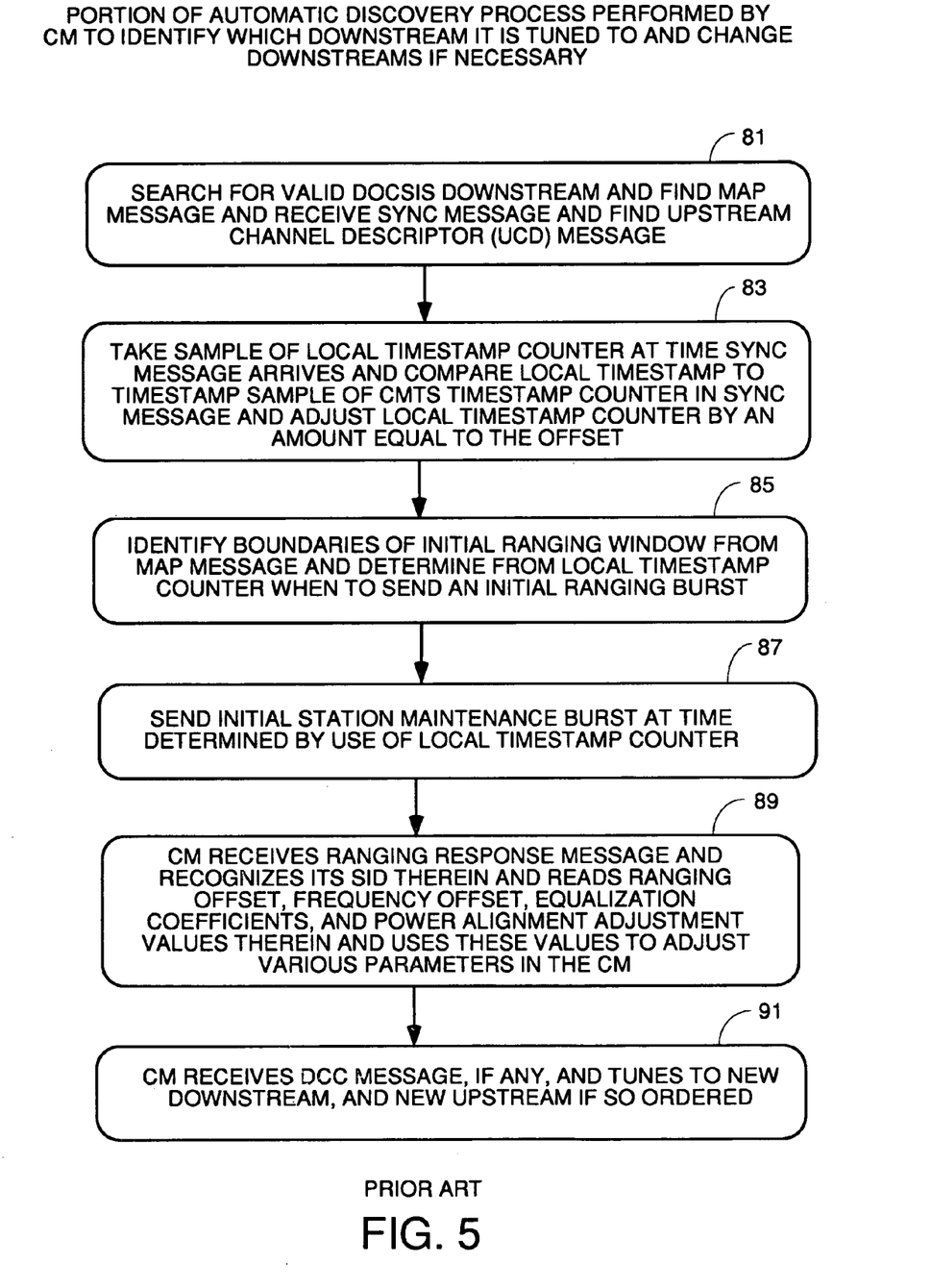
FIG. 5 is a flowchart of the portion of the automatic discovery process performed by the CM to identify which downstream it is listening to and change downstreams as so commanded by a dynamic channel change message (DCC) from the CMTS.

The automated discovery process is shown in flowchart form in FIGS. 4 and 5 and uses the ranging process transmissions to discover which downstream each CM is listening to which has sent a ranging burst. FIG. 4 illustrates the portion of the automatic discovery protocol performed by the CMTS, while FIG. 5 illustrates the portion of the discovery protocol performed by the CM. Step 69 represents the process of powering down the old CMTS without upstream sharing capability and installing a new CMTS with the capability of transmitting on multiple downstreams which all share the same upstream and the capability to do automatic discovery of the CMs on each downstream. When the new CMTS re-establishes a plurality of downstreams all mapped to the same upstream, the cable modems will randomly latch onto any valid DOCSIS downstream they find as the new downstreams are established. This is because when the old CMTS is shut down and the downstreams are interrupted, the CMs all initiate searches for new downstreams. When the new CMTS is powered up, it establishes a plurality of downstreams, all mapped to the same upstream, and each new downstream will have its own MAP, UCD and sync messages. This can be done on all downstreams at once or one downstream at a time. When each CM latches onto a new downstream, it re-does its initial training process, and it is the exchange of MAP, UCD and initial ranging burst messages which contain the information needed to build the routing tables.

It is important to interrupt the existing downstream service on any system which has CMs already connected and which are already trained and registered. This will force all CMs to re-do their initial ranging process, and this is what guarantees that all CMs will be found on each downstream and complete routing tables will be built so that when the CMTS receives a request from a particular CM, it will know upon which downstream to send the requested data.

In FIG. 4, step 70 represents the process of determining which downstream to do discovery upon using a round robin process in one embodiment, or deciding to do discovery on all downstreams in parallel. Doing discovery in parallel simply means sending MAP and UCD messages on each downstream and receiving all the initial ranging bursts on the shared upstream and reading the downstream IDs and SIDs in each initial ranging burst and putting the data into the appropriate routing table. Any other process to determine which downstream to process which insures that all downstreams are eventually subjected to the discovery process can also be used.

Step 70 also represents the process, in embodiments like that of FIG. 3, of telling the shared transmitter 62 which downstream is being processed and sending a command to the frequency agile modulator 64 telling it which downstream carrier frequency to generate.

The details of the discovery process for each downstream follow. Step 72 represents the process of sending a MAP message on the downstream being discovered. This MAP message invites any CMs on the paricular downstream being processed which have not yet trained to send an initial station maintenance (ranging) burst during an initial station maintenance ranging contention window the boundaries of which are identified in the MAP message. All the MAP messages on the downstreams must be coordinated so that they all define the same ranging contention interval in the upstream, and there is no conflict between the timeslot assignments on the upstream between different CMs.

Step 74 represents the process of sending a UCD message on this particular downstream that defines the shared upstream. This UCD message contains the upstream channel ID of the shared upstream channel. The UCD message must have the same parameters defining the shared upstream as all the other UCD messages sent on the other downstreams, but it also contains a downstream ID and this field must be set to the ID of the downstream on which this particular UCD is sent.

We temporarily turn now to what the CM is doing on its end. Step 81 in FIG. 5 represents the process carried out by the CM of searching for a valid DOCSIS downstream on the medium to which it is connected. Step 81 also represents the process of finding a MAP message in the downstream messages on that downstream. Step 81 also represents the process of finding a Sync message in the downstream and finding an Upstream Channel Descriptor (UCD) message.

Figure 7:
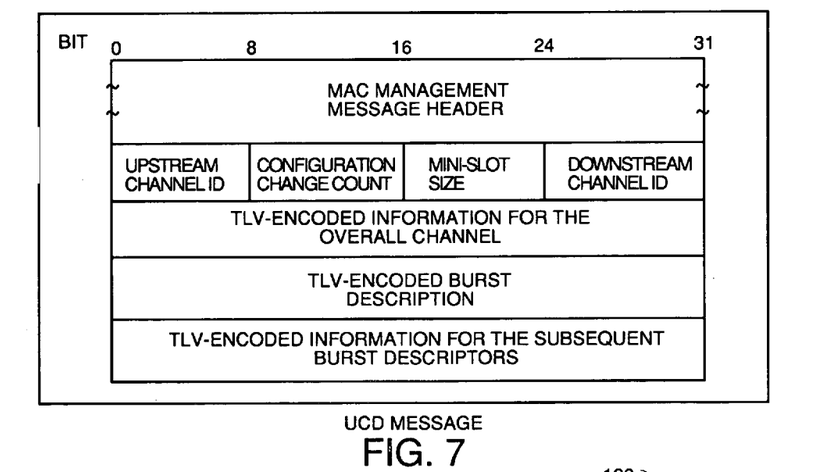
FIG. 7 is a diagram of the Upstream Channel Descriptor message.

The UCD message contains the information shown in FIG. 7 which includes the downstream channel ID of the downstream on which the UCD message was sent. The UCD message also contains the upstream channel ID of the upstream channel which the UCD defines. The UCD message contains many channel parameters that define the upstream (of a DOCSIS 2.0 channel for example) in terms of: modulation rate, frequency, preamble pattern, extended preamble pattern, whether SCDMA mode is enabled, the number of SCDMA spreading intervals per frame, the number of SCDMA codes per minislot, the number of active SCDMA codes, the SCDMA code hopping seed, the M and N integers that relate the downstream symbol clock rate to the upstream symbol clock rate, an SCDMA timestamp snapshot, a power spectral density parameter, whether or not ranging is required, the modulation type, whether differential encoding is on or off, the preamble length, a preamble value offset which defines which bits are to be in the preamble from a preamble superstring, a T value for Forward Error Correction (FEC) error correction encoding, a K value defining the number of bytes in an FEC code word, a scrambler seed, a maximum burst size, a guard time size, the last codeword length, whether scrambling is on or off, a Reed Solomon (RS) interleaver depth, a RS interleaver block size, modulation type of the preamble, whether SCDMA spreading is on or off, the number of SCDMA codes per subframe, an SCDMA framer interleaver step size and whether Trellis encoding is on or off.

Step 83 in FIG. 5 represents the step of comparing the time of arrival of the sync message as determined from a local timestamp counter in the CM and comparing that time of arrival to the time of transmission of the sync message as indicated by the CMTS timestamp count sample in the sync message. Since both timestamp counters in the CMTS and CM are counting the ticks of a 10.24 MHz clock, the offset between the two timstamp count samples in the sync message and from the local timestamp counter taken at the time of arrival of the sync message is indicative of the propagation time of the sync message from the CMTS to the CM. The CM then adjusts its local timestamp counter by an amount of this offset to make it appear as if the CM was located right next to the CMTS. Step 85 represents the process of identifying from the MAP message the boundaries of the initial station maintenance contention window (hereafter the initial ranging window). Step 85 also represents the process of using the local timestamp counter to determine when to send the initial ranging burst upstream. The local timestamp counter is used to identify the boundaries of the upstream minislots but it is only approximately correct at this point and will not be correct until the ranging process is complete.

Figure 6:
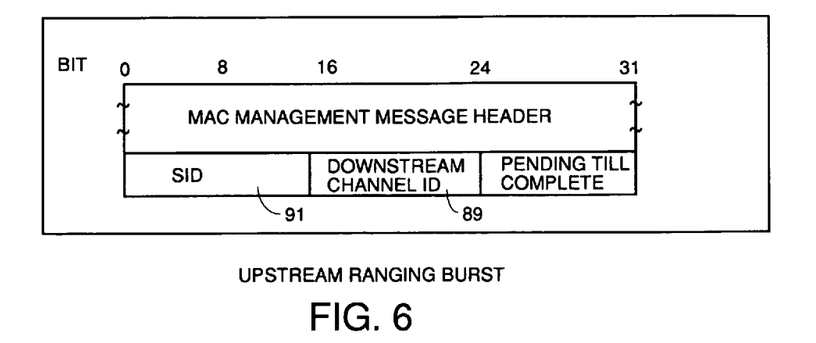
FIG. 6 is a diagram of the upstream ranging burst.

Step 87 represents the process of sending the initial station maintenance ranging burst at the time determined from the local timestamp counter. This ranging burst has the message format as shown in FIG. 6. The field 89 in the burst header identifies the downstream channel ID of the downstream channel to which the CM is tuned, as determined from the downstream channel ID learned from the UCD message found in the downstream message traffic in step 81. The field 91 is an initialization SID which identifies the cable modem to the CMTS.

Returning to FIG. 4, step 76 represents the process of receiving the initial ranging burst message of 6 and reading the downstream channel ID from the message and the SID and entering this information in a routing table for this downstream and repeating this process for all other initial ranging bursts received.

How does this process of FIG. 4 guarantee that all CMs on all downstreams will be found by the CMTS? When a new CMTS having this automatic discovery and upstream sharing capability is installed, the old CMTS will be shut down. This means that all downstreams will be interrupted. When a CM loses its downstream service, its software causes it it re-start a search for a new valid DOCSIS downstream. When the new CMTS is installed, it will start transmitting multiple downstreams all mapped to a single shared upstream. Each of these downstreams will contain the same MAP message which identifies when the initial ranging burst contention interval is on the shared upstream, and each downstream will contain the same UCD message defining the upstream, but each UCD message on a particular downstream will contain the downstream ID of that downstream as well as the shared upstream ID.

As each CM reacquires a new downstream, it finds the MAP and UCD and sync messages for that downstream and again sends an initial ranging burst as described herein. These initial ranging bursts will be received as each downstream is processed by the CMTS, and a fresh routing table for each downstream will be built which includes all CMs on that downstream. That is all the CMTS needs to complete building of the routing tables, and the routing table will be complete and contain information for every downstream which identifies every cable modem on that downstream.

Step 78 represents the process of measuring the ranging offset, frequency offset, adapting the upstream equalization coefficients and making power alignment measurement. The CMTS then sends to the CM that sent the initial ranging message a ranging response message and includes therein values for the ranging offset, frequency offset, equalization coefficients and power alignment values.

Step 80 represents the process of returning to step 70 and processing the next downstream if a round robin approach is being used and the downstreams are not being subjected to discovery in parallel.

Because the CMs randomly latched onto the first valid downstream they found when the new CMTS was powered up, the load of the CMs on the various downstreams may not be optimal. Step 82 represents the process of doing any form of downstream load balancing and sending DCC messages downstream to the CMs that need to be moved instructing them as to which new downstream and/or upstream they should tune.

Returning to FIG. 5, step 89 represents the process in the CM of receiving a ranging response message and scanning it for the SID of the CM. If the ranging response message just received has the SID of the CM that it used in its initial ranging burst, then this ranging response message is a response to the ranging burst sent by the CM and the parameters in the message are directed to this CM. The CM then reads the ranging offset, frequency offset, equalization coefficients, and power alignment value and uses these values to adjust various parameters in the CM for future upstream transmissions.

Step 91 represents the process of receiving any DCC messages sent by the CMTS to do load balancing and tuning to any new downstream and/or upstream so ordered in the DCC message.

Figure 8:
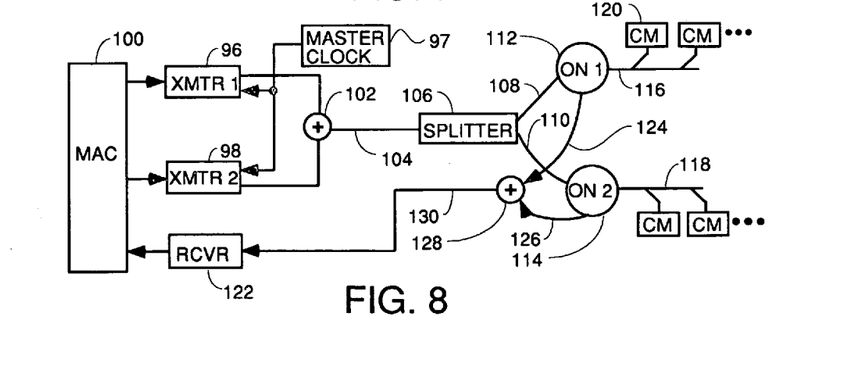
FIG. 8 is a diagram of one scenario of two separate downstream, both of which are coupled to two different optical nodes with a shared upstream.

FIG. 8 is a diagram of one scenario of two separate downstreams, both of which are coupled to two different optical nodes with a shared upstream. Transmitters 96 and 98 each get separate downstream message and data streams from media access control process running on computer 100. Each downstream transmitter sends the same UCD message that defines the upstream but which contains the downstream ID of the downstream the UCD message is transmitted upon. Sync messages are also sent on each downstream which contain timestamp samples of the count of a timestamp counter in each transmitter, each of which counts ticks of the same master clock 97. Each downstream transmitter sends a coordinated MAP message that defines the same upstream ranging contention interval. The downstreams are summed in summer 102 (just a superposition junction since both downstreams are on different frequency) and transmitted simultaneously on fiber 104 to splitter 106. Copies of both downstreams are sent out on fibers 108 and 110 to optical nodes 112 and 114. In each optical node, the downstreams are converted to electrical signals at different carrier frequencies and sent out on coaxial cables 116 and 118, respectively, to cable modems of which block 120 is representative.

The cable modems respond to the MAP message on the downstream they are listening to by sending an upstream ranging burst during the ranging contention interval. The ranging bursts are sent upstream on coax cables 116 and 118 and are converted to optical signals by the nodes 112 and 114. These optical signals are transmitted on separate upstream fibers 124 and 126 and are combined in a summer 128 for transmission upstream on fiber 130. The upstream receiver 120 receives these bursts and makes timing offset measurements (assuming the bursts have not collided), equalization coefficient adaptation, frequency offset measurements (both are on the same frequency) and power alignment measurements. The ranging messages are passed to the media access control process on computer 100 which extracts the SID and downstream ID from each ranging burst and builds a routing table for each downstream. If the load of CMs on a particular downstream is not optimal, the MAC process causes DCC messages to be sent to the CMs it wants to move to cause them to move to another downstream. The same type message can also be sent to cause them to move to a different upstream.

Figure 9:
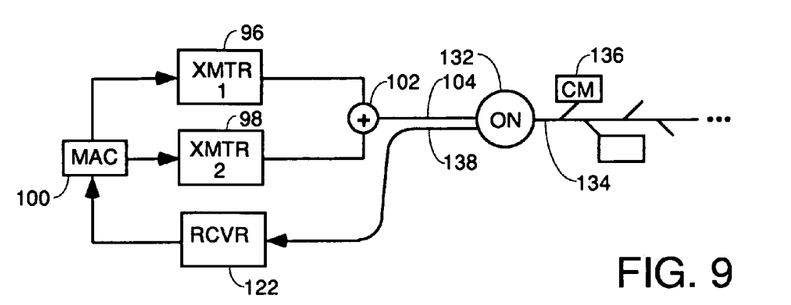
FIG. 9 is an alternative embodiment of the system shown in FIG. 8.

FIG. 9 is another topology in which the invention can be used. The two downstreams on different frequency carriers are transmitted by transmitters 96 and 98 to summer 102 where they are summed by superposition for transmission on fiber 104 to optical node 132. Optical node converts the downstreams to RF signals on different frequencies and sends them on coaxial cable 134 to the cable modems of which block 136 is typical. The shared upstream ranging bursts are transmitted at the same frequency on coax 134 and are converted to optical signals on upstream optical fiber which conveys them to receiver 122 at the CMTS where the routing tables are built by MAC process 100.

Figure 10:
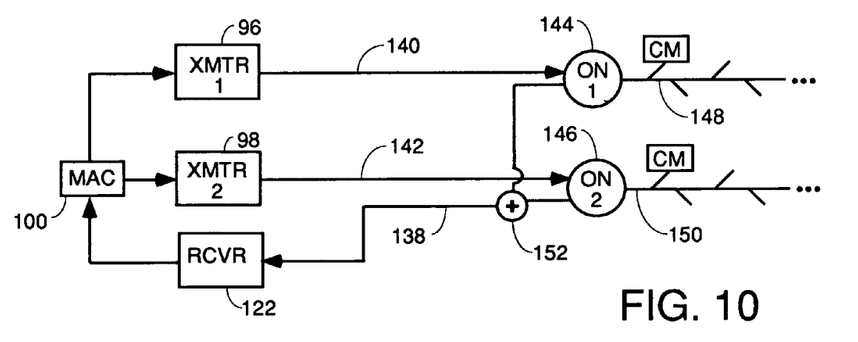
FIG. 10 is another alternative embodiment of the system shown in FIG. 8.

FIG. 10 represents another topology in which the invention can be used.

In this embodiment, two separate downstream fibers 140 and 142 carry the two downstreams from transmitters 96 and 98 to optical nodes 144 and 146 which convert them to electrical signals. Downstream 1 is sent out from optical node 144 on coax 148, and downstream 2 is sent out from optical node 146 on coax 150. The shared upstream is transmitted back on the coax to the two optical nodes where the ranging bursts (and other upstream traffic) are converted to optical signals, combined in summer 152 and transmitted on upstream fiber 138 to receiver 122 and passed to the upstream manager process in MAC process 100 which builds a routing table that defines which CMs are tuned to each downstream.

Flexible Mapper of Downstreams to Upstreams

One of the problems with today's CMTS structures is that there is a fixed ratio of upstreams per downstream and more upstreams and downstreams cannot be added on one by one basis. Because of this, the wiring at the CMTS is fixed. With the new CMTS structure defined herein, individual downstreams can be added on a one by one basis as needed to meet demand, and multiple downstreams can be mapped to the same shared upstream. With the fixed wiring of the CMTS, this is a problem that requires re-wiring and splitting of optical nodes each time a change in the number of downstreams or upstreams is changed. Therefore, a need has arisen for a circuit which can flexibly map multiple downstreams onto one or more downstream fibers, all of which are mapped to the same shared upstream.

Figure 11:
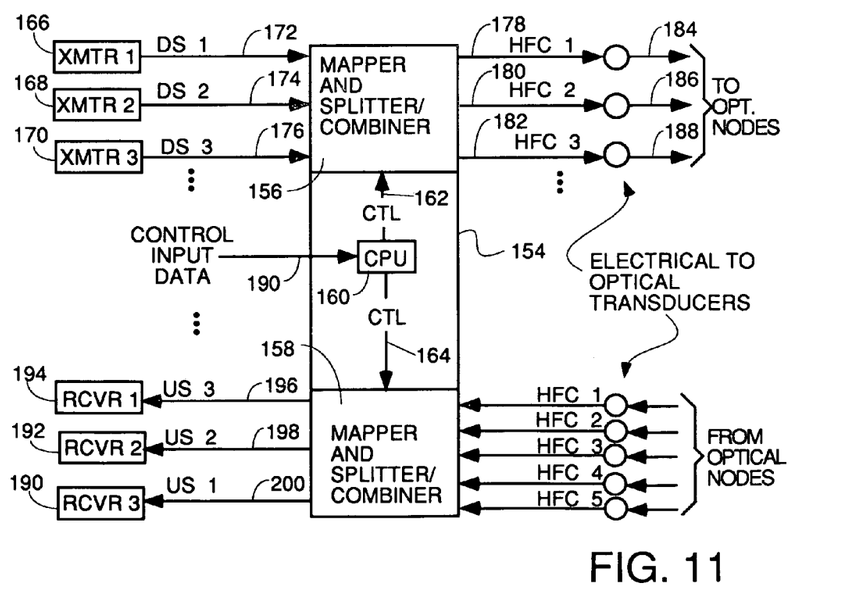
FIG. 11 is a block diagram of a circuit for mapping multiple downstreams.

FIG. 11 a block diagram of the needed circuit. A flexible mapper 154 is comprised of a downstream mapper and splitter/combiner 156 and an upstream mapper and splitter/combiner 158, each of which is controlled by computer or other control logic 160. The function of the computer or control logic 160 is to receive information from the media access control process or some other source such as a control panel operated by the cable operator and suitable control the mapper 154. The information received is about which downstreams are to be transmitted on which HFC systems, and which downstreams are to be mapped to which upstreams. The computer and control logic then generates suitable control signals on line 162 and 164 to cause the desired mapping.

Specifically, the various downstream transmitters 166, 168 and 170 generate separate coordinated downstreams on lines 172, 174 and 176, all of which are coupled to the downstream mapper and splitter/combiner 156 (hereafter the DS mapper). Lines 178, 180 and 182 represent electrical lines which carry signals which are converted to optical signals by transducers and coupled by fibers (not shown) to different optical nodes of one or more HFC systems. The function of DS mapper is to couple the designated downstreams to the designated optical nodes and to allow easy reconfiguration of which downstreams are coupled to which optical nodes by simply changing the control inputs. Suppose, DS1, DS2 and DS3 are all to share the same upstream US 1, but DS1 and DS2 are to be coupled to HFC 1 and DS 3 is to be coupled to HFC 2. In this case, DS mapper takes DS1 and DS2 and sums them by superposition (they are on different frequencies) and couples the resulting signal onto HFC 1. DS3 is simply switched to HFC 2. Suppose also that a DS4 (not shown) is to be split and transmitted on HFC 3, 4 and 5 (HFC 4 and 5 not shown). In this case, DS mapper 156 switches DS4 to an internally splitter input and couples the outputs of the splitter through a multiplexer to HFC 4 and 5. All this can be controlled simply by supplying the appropriate control input data on line 90 to the computer or control logic 160. Whatever is supplying the control data on line 190 (usually the MAC process) needs to make sure that all the downstreams which share the same upstream are coordinated as that term is defined in the Summary of the Invention.

The upstream mapper and splitter/combiner 158 (hereafter the US mapper) is coupled to all the HFC systems HFC1 through HFC5 at its upstream input side and is coupled to CMTS receivers 1-3 via upstream lines 196, 198 and 200. In the hypothetical above, suppose DS1 through DS4 are all to share the CMTS receiver 190 and upstream line 200. In this situation, since the upstreams are coming back on HFC1 through HFC5, the US mapper 158 must combine all the electrical signals on HFC1 through HFC5 by superposition and output the result onto US1 on line 200.

In summary, the function of the DS mapper 156 is to flexibly couple M downstreams to N optical nodes and have the mapping controlled electronically so that it can be easily changed. Whatever switching, splitting and/or combining of downstream DOCSIS or other data streams that is necessary to accomplish this M to N mapping function will be performed automatically. Thus, for example if three downstreams on different frequencies are to be combined and then coupled to each of two optical nodes, the three downstream RF frequencies will be combined by switching them all to one superposition summation node at the input of a splitter with two outputs and then switching the two outputs of the splitter to coupled them to the appropriate lines coupled to the optical nodes to which the downstreams are to be coupled. Similarly, any downstream can be split and coupled to any number of optical nodes simply by supplying the data which defines the desired number of splits and which downstreams are to be coupled to which optical nodes.

In summary, the function of the US mapper is to take shared upstreams from any number of designated optical nodes which are all the same upstream and mapped to a plurality of downstreams and combine them into one shared upstream for input to a single shared CMTS receiver. This can be done simultaneously for multiple CMTS receivers.

An upstream and downstream manager process in the media access control process can monitor traffic loads and reconfigure the system as needed by adding more downstreams, adding more shared upstreams mapped to multiple downstreams, combining more shared upstreams to one receiver, all as needed to balance the upstream and downstream loads. In addition, the upstream and downstream manager, in some embodiments, monitors the upstream receivers and downstream transmitters for failure, and, upon detecting a failure, switches a new receiver or transmitter into the mix as needed to take over the work formerly being done by the failed unit.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A method for flexibly mapping a plurality of coordinated downstreams transmitted by a downstream transmitter to a plurality of optical nodes and combining shared upstreams arriving from a plurality of optical nodes and coupling them to the input of a shared cable modem termination system (CMTS) receiver having a master clock, comprising:
   1) receiving input data defining which of the plurality of optical nodes are to receive which coordinated downstreams and which CMTS;
   2) doing all necessary switching, combining and splitting to couple the designated coordinated downstreams output from one or more downstream transmitters to the designated optical nodes;
   3) doing all necessary combining and switching to combine shared upstreams from different optical nodes into one upstream shared by the designated coordinated downstreams and switch the shared upstream to the inputs of one or more CMTS receivers;
   4) monitoring for failures of said one or more downstream transmitters which supply said coordinated downstreams and monitoring for failures of said one or more CMTS receivers and, when a failure is detected, causing a new transmitter or receiver to be switched in to do the work of the failed component and switching the message and data traffic that was being input to the failed component to the input of the substitute component that is taking over the work of the failed component and switching the output of the substitute component to couple said output to the same optical node or nodes in the case of a failed transmitter or the same media access control process for a shared upstream in the case of a failed receiver.

2. The method of claim 1 further comprising the step of monitoring the upstream and downstream traffic loads and automatically adding more coordinated downstreams and more shared upstreams if necessary to meet demand and automatically altering the data supplied in step 1 to cause the new coordinated downstreams and upstreams to be coupled to the appropriate optical nodes and CMTS receivers, respectively.

3. The method of claim 1 wherein step 1 comprises downstreams from transmitters which have timestamp counters, all of which are counting the ticks of the same master clock in said CMTS.

4. The method of claim 3 wherein step 2 comprises transmitting downstream MAP messages on each downstream which have no conflicts in upstream channel assignments or timeslot assignments.

5. The method of claim 4 wherein step 2 comprises transmitting downstreams which all have the same symbol rate and symbol clocks which are locked in frequency in phase.

6. A flexible mapper for flexibly mapping coordinated downstreams that share the same upstream to one or more designated optical nodes, comprising:
- a downstream mapper and splitter/combiner having a plurality of inputs for coupling to a plurality of downstream transmitters supplying coordinated downstreams and having a plurality of outputs for coupling directly or indirectly to a plurality of optical nodes, and having a control input;
- an upstream mapper and splitter/combiner having a plurality of inputs for coupling directly or indirectly to a plurality of optical nodes and having a plurality of outputs for coupling to one or more cable modem termination system receivers, and having a control input;
- a control computer or control logic having an input for receiving control data indicating which coordinated downstreams are to be coupled to which optical nodes and which upstreams which optical nodes are to be coupled to which CMTS receivers and programmed to generate suitable control signals to said downstream mapper and splitter/combiner and to said upstream mapper and splitter/combiner to cause these devices to carry out the desired mapping.

7. A method for flexibly mapping a plurality of coordinated downstreams transmitted by a downstream transmitter to a plurality of optical nodes and combining shared upstreams arriving from a plurality of optical nodes and coupling them to the input of a shared cable modem termination system (CMTS) receiver having a master clock, comprising:
1) receiving input data defining which of the plurality of optical nodes are to receive which coordinated downstreams and which CMTS;
2) doing all necessary switching, combining and splitting to couple the designated coordinated downstreams output from one or more downstream transmitters to the designated optical nodes;
3) doing all necessary combining and switching to combine shared upstreams from different optical nodes into one upstream shared by said designated coordinated downstreams and switch said shared upstream to the inputs of one or more CMTS receivers
4) monitoring the upstream and downstream traffic loads and automatically adding more coordinated downstreams and more shared upstreams if necessary to meet demand and automatically altering the data supplied in step 1 to cause the new coordinated downstreams and upstreams to be coupled to the appropriate optical nodes and CMTS receivers, respectively.

8. The method of claim 7 wherein step 1 comprises downstreams from transmitters which have timestamp counters, all of which are counting the ticks of the same master clock in said CMTS.

9. The method of claim 8 wherein step 2 comprises transmitting downstream MAP messages on each coordinated downstream which have no conflicts in upstream channel assignments or timeslot assignments.

* * * * *